M. HAMBURGER.
LINK CUSHION TIRE.
APPLICATION FILED JUNE 28, 1918.
1,335,496.
Patented Mar. 30, 1920.
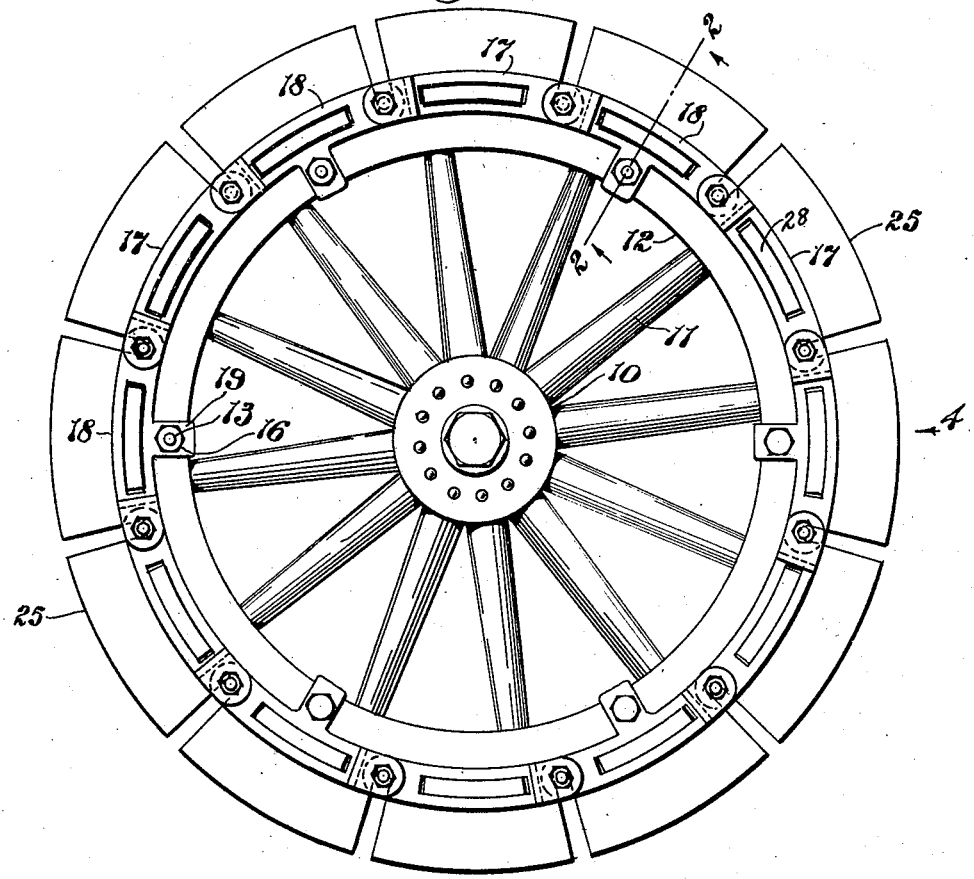
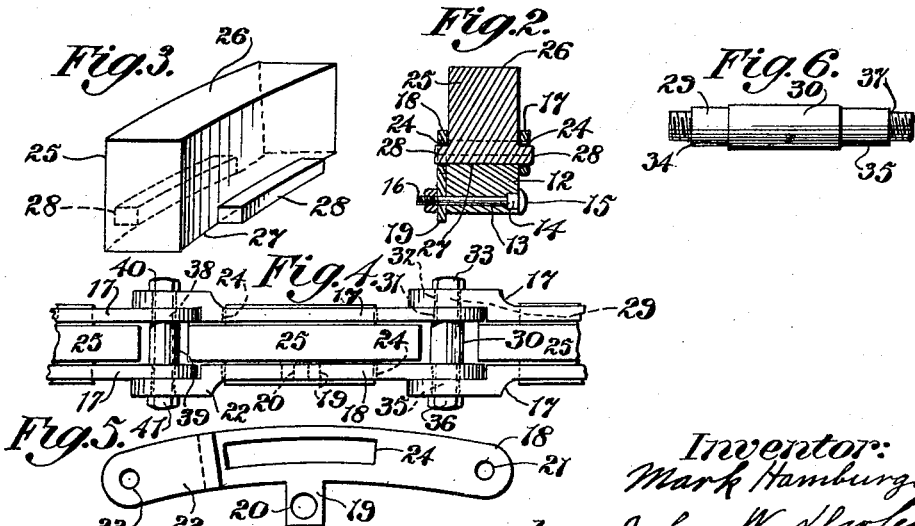
Inventor:
Mark Hamburger.
by John W. Darley.
Atty.

UNITED STATES PATENT OFFICE.

MARK HAMBURGER, OF BALTIMORE, MARYLAND.

LINK CUSHION-TIRE.

1,335,496.          Specification of Letters Patent.     Patented Mar. 30, 1920.

Application filed June 28, 1918. Serial No. 242,388.

*To all whom it may concern:*

Be it known that I, MARK HAMBURGER, a citizen of the United States, residing at Baltimore, in the State of Maryland, have invented certain new and useful Improvements in Link Cushion-Tires; and I do hereby declare the following to be a full, clear, and exact description of the invention, such as will enable others skilled in the art to which it appertains to make and use the same.

My invention relates to link cushion tires.

One object of my invention is to provide a link cushion tire which can be folded into small space and carried in the tool box of an automobile.

Another object of my invention is to provide a link cushion tire which can be readily secured to the felly of a wheel after the ordinary pneumatic tire has been removed therefrom.

Another object of my invention is to provide a link cushion tire provided with fastening members by means of which said tire can be readily secured by the bolts which usually secure a demountable rim to the felly of the wheel.

A further object of my invention is to provide a link cushion tire in which each section may be replaced by a new section in case of damage to the metallic or rubber parts thereof.

A further object of my invention is to provide a link cushion tire which shall be light, simple and cheap and capable of either continued or emergency use.

In the drawings:—

Figure 1 represents a side view of a wheel equipped with my improved link cushion tire.

Fig. 2 is a section along the line 2—2 of Fig. 1 looking in the direction of the arrows.

Fig. 3 is a perspective view of one of the rubber blocks which are used in my improved tire.

Fig. 4 is a partial view of my improved tire looking in the direction of the arrows 4 in Fig. 1.

Fig. 5 is a side view of one of the fastening links used in the construction of my improved tire.

Fig. 6 is a view of one of the bolts which are used to secure the links of my improved tire together.

In the drawings:—

10 represents the hub of the wheel which is revolubly mounted upon any approved form of axle in any approved way.

11 are the spokes which are secured in the hub 10 and the outer ends thereof are secured in the felly 12. The felly 12 is provided with a plurality of holes for the reception of bolts such as 13 and each of said bolts is provided with a square shank 14 which fits snugly in a square socket provided in the felly 12 and prevents the bolt from turning. Each of the bolts 13 is also provided with a head 15. Said bolts 13 fit snugly in holes provided in the felly 12, and are provided with threaded ends which project beyond the felly 12 and nuts such as 16 are threaded upon said threaded ends.

The bolts 13 and nuts 16 are those usually provided for the securing of the ordinary demountable tire rim to the felly 12.

I make use of the bolts 13 to secure my improved link cushion tire to the felly 12.

The metallic portion of my improved link cushion tire comprises a plurality of links such as 17. All of the links on the inside of the wheel are shaped as are the links 17 shown on the outside of the wheel in Fig. 1, but each alternate link 18 on the outside of the wheel, see Fig. 1, is provided with a tab 19 having the hole 20 therein for the reception of the bolt 13.

The links 18 are each provided with holes 21 in one end thereof and with an offset 22 at the other end thereof, and in the end of said offset there is provided the hole 23. The link 18 is also provided with the slot 24 for a purpose hereinafter referred to.

The links 17 and 18 are similar with the exception that the tab 19 and hole 20 are omitted from the links 17.

The resilient portion of my improved link cushion tire is provided by the block 25 shown in Fig. 3. The block 25 is formed of rubber or any suitable composition that will have the proper physical qualities that will provide the resilience required and enable it to resist abrasion and the compressive and shearing forces to which it may be subjected and also the chemical qualities which will enable it to resist the corrosive agents that it may be expected to encounter on the road.

The block 25 is preferably formed with the surfaces 26 and 27, cylindrical in shape, so that when the blocks 25 are in place upon the wheel the surfaces 26 together will form approximately a cylindrical surface and the surfaces 27 will fit upon the outside of the felly 12.

The block 25 is provided with wings 28—28 formed integrally therewith and said wings are of such cross section and length as to fit the slots 24 in the links 17 and 18, see Fig. 2.

In assembling my improved tire, a plurality of links such as 17 and 18 are assembled together by passing one end such as 29 of the bolt 30 through the holes 31 of one link and the hole 32 of another link and then tightening the nut 33. The nut 33 is arranged to fit against the shoulder 34 provided on the bolt 30, thus insuring that the links 17 will turn freely upon the end 29 of the bolt 30. After sufficient of the links 17 are assembled together to fit around the inside of the felly 12, the wings 28 of the proper number of blocks 25 are pushed through the slots 24 and the links 17 and 18 are then placed on the ends 35 of the bolts 30, care being taken that the wings 28 are introduced within the slots 24, and then the nuts 36 are screwed down upon the shoulder 37, thus insuring that the links 17 and 18 will revolve freely upon the ends 29 and 35.

Thus it will be noted that the links are all revolubly mounted upon the ends of the bolts 30 and that the blocks 25 are secured between the links.

The manner of assembling just described is that used when it is desired to transport my improved link cushion tire in circular shape, but when it is desired to fold same into small compass, I omit the central enlarged portion from one of the bolts such as 38 in Fig. 4 and provide a collar 39 which slips loosely over said bolt. As a consequence of this construction, by loosening one of the nuts 40 or 41, the bolt 38 can be removed from the links 17—17 and 17 and 18 and the abutting parts of said links can then be separated and the tire folded into a comparatively small space.

It is to be noted that I arrange my link cushion tire so that the surface 27 of the block 25 will abut against the felly 12, and thus the pressure applied to the surface 26 when the wheel is running on the road serves to make the block 25 grip tightly against the felly 12, which greatly increases the friction between said parts and eliminates, or greatly reduces, the stress that would otherwise be applied to the wings 28 by the links 17 and 18.

I consider this a very valuable feature of my invention as it entirely obviates the necessity for adjusting my tire to a close fit upon the felly 12.

The links 17 and 18 may be formed of any approved material and said links and the block 25 may be made in many forms, and the links may be articulated in many ways without departing from the spirit of my invention.

I claim:—

1. In a link cushion tire, the combination with a wheel, a plurality of links on one side of said wheel and a plurality of links on the other side of said wheel, of bolts for joining said links together, slots in said links and resilient blocks having wings mounted in the slots in said links.

2. In a link cushion tire, the combination with a wheel, a plurality of links on one side of said wheel, a plurality of bolts, the ends of a pair of adjacent links being articulated together by one of said bolts, a plurality of links on the opposite side of said wheel, the ends of a pair of adjacent links in said last-named plurality of bolts corresponding to said first named pair, being articulated together by the other end of said bolt, slots in said links, and resilient blocks having wings mounted in the slots in said links.

3. In a link cushion tire, the combination with a wheel, a plurality of links on one side of said wheel and a plurality of links on the other side of said wheel, said links having cylindrical holes near their ends, of bolts having cylindrical ends revolubly mounted in said holes for joining said links together and resilient blocks mounted in said links, one of said bolts being provided with a loose collar thereon between the links, and the rest of said bolts being provided with an enlarged body between the links.

In testimony whereof I affix my signature.

MARK HAMBURGER.